United States Patent
Nonami et al.

(10) Patent No.: US 11,720,211 B2
(45) Date of Patent: Aug. 8, 2023

(54) TOUCH SENSOR

(71) Applicant: Panasonic Intellectual Property Management Co., Ltd., Osaka (JP)

(72) Inventors: Yuji Nonami, Osaka (JP); Hirofumi Yamada, Osaka (JP); Tetsuya Minamide, Osaka (JP); Shigeyuki Fujii, Okayama (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/776,156

(22) PCT Filed: Oct. 30, 2020

(86) PCT No.: PCT/JP2020/040802
§ 371 (c)(1),
(2) Date: May 11, 2022

(87) PCT Pub. No.: WO2021/131319
PCT Pub. Date: Jul. 1, 2021

(65) Prior Publication Data
US 2022/0397970 A1 Dec. 15, 2022

(30) Foreign Application Priority Data
Dec. 25, 2019 (JP) .................. 2019-234711

(51) Int. Cl.
*G06F 3/044* (2006.01)
(52) U.S. Cl.
CPC ................... *G06F 3/044* (2013.01)

(58) Field of Classification Search
CPC ................. G06F 3/044; G06F 2203/04112
See application file for complete search history.

(56) References Cited

U.S. PATENT DOCUMENTS

| | | | |
|---|---|---|---|
| 2013/0307565 A1* | 11/2013 | Ra | G06F 3/0445 |
| | | | 427/108 |
| 2016/0278205 A1 | 9/2016 | Bae et al. | |
| 2019/0212854 A1 | 7/2019 | Noma | |

FOREIGN PATENT DOCUMENTS

| | | |
|---|---|---|
| JP | 2016-510153 A | 4/2016 |
| JP | 2019-121311 A | 7/2019 |

OTHER PUBLICATIONS

International Search Report issued in International Patent Application No. PCT/JP2020/040802, dated Dec. 8, 2020, with English translation.

* cited by examiner

*Primary Examiner* — Michael Pervan
(74) *Attorney, Agent, or Firm* — McDermott Will & Emery LLP

(57) ABSTRACT

A touch sensor includes a substrate with a first surface, and a plurality of first electrodes on the first surface of the substrate in a view area. The first surface of the substrate includes a plurality of bottomed grooves extending linearly. Each first electrode includes a plurality of fine lines including a conductive material buried in one of the grooves. Each fine line includes a bottomed recess recessed from the first surface toward the bottom surface of each groove.

5 Claims, 19 Drawing Sheets

AFTER PLATING

AFTER REMOVAL

TOUCH SENSOR

CROSS-REFERENCE OF RELATED APPLICATIONS

This application is the U.S. National Phase under 35 U.S.C. § 371 of International Patent Application No. PCT/JP2020/040802, filed on Oct. 30, 2020, which in turn claims the benefit of Japanese Patent Application No. 2019-234711, filed on Dec. 25, 2019, the entire disclosures of which Applications are incorporated by reference herein.

TECHNICAL FIELD

The present disclosure relates to a touch sensor.

BACKGROUND ART

What is disclosed in Patent Document 1 is known as a touch sensor that allows a touch operation.

Patent Document 1 discloses a touch sensor with a view area (i.e., a display area for displaying an image). This touch sensor includes a light-transmissive cover member (i.e., a polarizer), a substrate with a surface facing the back surface of the cover member, and a plurality of electrodes (i.e., touch electrodes) on the surface of the substrate in the view area.

The substrate has a plurality of bottomed grooves (grooves for forming conductive layers and lines) on its surface. Each electrode includes a plurality of fine lines in a predetermined pattern (e.g., a mesh pattern) on the surface of the substrate. Each fine line is a conductive layer with a metal material with an excellent conductivity buried in one of the grooves. The outer surface of the conductive layer faces the cover member (i.e., the polarizer) and is formed as a flat surface flush with the surface of the substrate.

CITATION LIST

Patent Document
Patent Document 1: Japanese Unexamined Patent Publication No. 2019-121311

SUMMARY OF THE INVENTION

Technical Problems

In the touch sensor of Patent Document 1, external light incident from the outside of the touch sensor (i.e., from the front surface of the cover member) toward the inside of the touch sensor is reflected (i.e., specularly reflected) toward the cover member over the entire outer surface of the conductive layer. Accordingly, the plurality of fine lines forming each electrode becomes conspicuous, when the user views the touch sensor from the outside. That is, in the touch sensor according to Patent Document 1, the plurality of electrodes in the view area is conspicuous, which causes the problem of deteriorating the visibility of the view area in the touch sensor.

The present disclosure was made in view of the problems. It is an objective of the present disclosure to improve the visibility of a view area of a touch sensor.

Solutions to the Problems

In order to achieve the above objective, an embodiment of the present disclosure provides a touch sensor with a view area. The touch sensor includes: a substrate with a first surface; and a plurality of first electrodes on the first surface of the substrate in the view area. The first surface of the substrate includes a plurality of bottomed grooves extending linearly. Each of the plurality of first electrodes includes a fine line including a conductive material buried in one of the plurality of grooves. The fine line includes a recess recessed from the first surface toward a bottom surface of each of the plurality of grooves.

Advantages of the Invention

The present disclosure improves the visibility of a view area of a touch sensor.

DESCRIPTION OF EMBODIMENT

An embodiment of the present disclosure will be described below with reference to the drawings. The following description of the embodiments is merely exemplary in nature and is not intended to limit the present disclosure, its application, or its uses.

Figure 1:
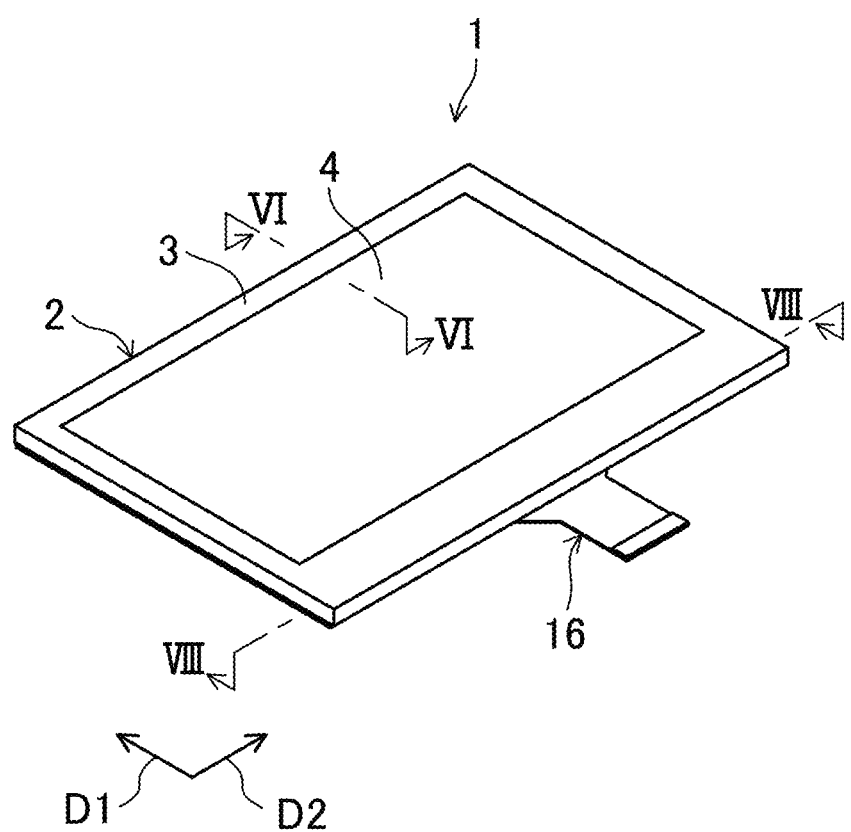
FIG. 1 is an overall perspective view of a touch sensor according to an embodiment of the present disclosure.

FIG. 1 shows an overall configuration of a touch sensor 1 according to an embodiment of the present disclosure. The touch sensor 1 is a sensing input device on which a touch operation may be performed. The touch sensor 1 is used as an input device for, for example, an on-vehicle device such as a car navigation system, a display device of a personal computer, a mobile phone, a portable information terminal, a portable game machine, a copying machine, a ticket vending machine, an automatic teller machine, or a clock.

In the following description, an operation screen 4 of a cover member 2, which will be described later, is located on a "front side" of the touch sensor 1, whereas the opposite side is referred to as a "back side" of the touch sensor 1. With these terms, the positional relationships between the elements constituting the touch sensor 1 will be defined. In this embodiment, for the sake of simplicity, a first direction d1 extends from the bottom to the top on each paper of FIGS. 1 to 5, whereas a second direction d2 extends from the left to the right on each paper of FIGS. 1 to 5.

(Cover Member)

As shown in FIG. 1, the touch sensor 1 includes a light-transmissive cover member 2. The cover member 2 is a cover lens made of, for example, cover glass or plastic. The cover member 2 is the shape of a rectangular plate, for example, in a plan view. The cover member 2 is fixed to a first surface 5a of a substrate 5, which will be described later, by an adhesive layer 21, which will be described later (see FIGS. 6 and 8).

Figure 6:
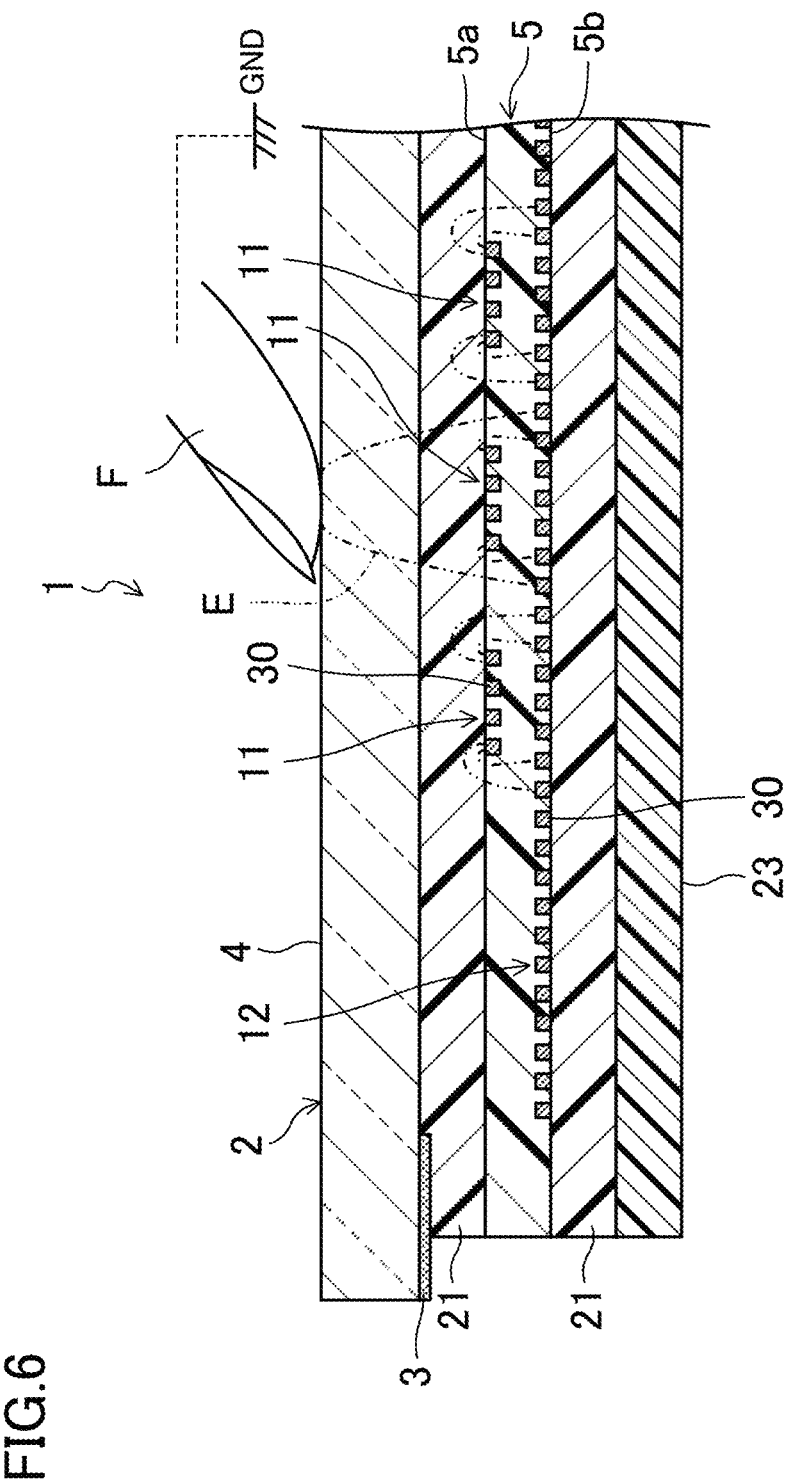
FIG. 6 is a cross-sectional view taken along line VI-VI of FIG. 1.
Figure 8:
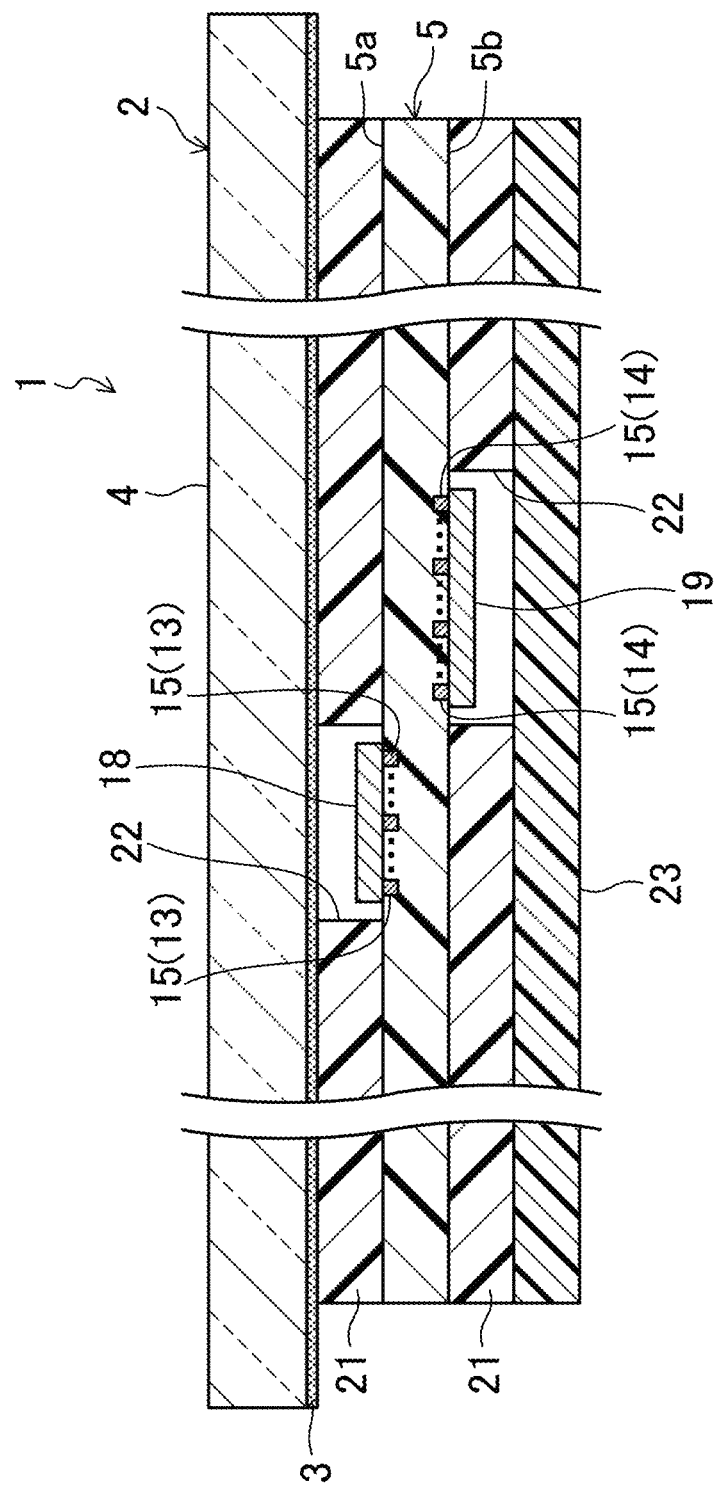
FIG. 8 is a cross-sectional view taken along line VIII-VIII of FIG. 1.

As shown in FIGS. 1, 6, and 8, on the peripheral edge of the back surface of the cover member 2, a fringe 3 is substantially in a frame shape in a dark color such as black by screen printing, for example. The internal rectangular region surrounded by this fringe 3 serves as a light-transmittable view area V. That is, the user obtains visual information from a display panel (not shown) on the back side of the touch sensor 1 through the view area V. The surface of the cover member 2 in the view area V serves as the operation screen 4 touched by a user's finger F (see FIG. 6) in accordance with a touch operation.

(Substrate)

As shown in FIGS. 2 to 5, the touch sensor 1 includes the substrate 5. The substrate 5 is substantially in a rectangular shape in a plan view. As shown in FIGS. 6 and 8, the substrate 5 has the first surface 5a and a second surface 5b. The substrate 5 is obtained by stacking the first surface 5a facing the back surface of the cover member 2 with the adhesive layer 21, which will be described later, interposed therebetween. In FIGS. 6 and 8, first and second groove forming layers 7 and 8, which will be described later, are not shown for the sake of simplicity.

Figure 11:
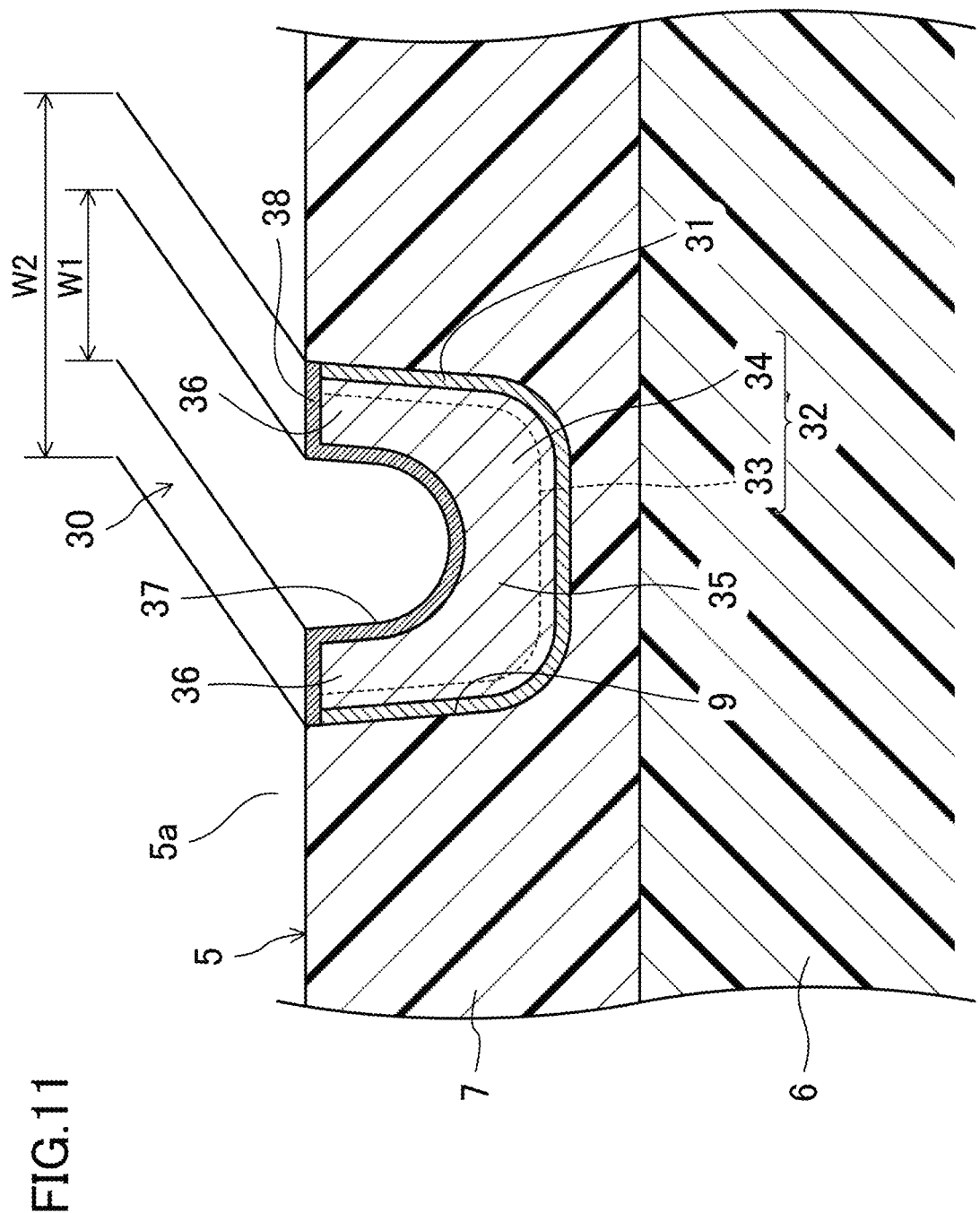
FIG. 11 is a cross-sectional view schematically showing a cross section of each fine line of each first electrode.
Figure 12:
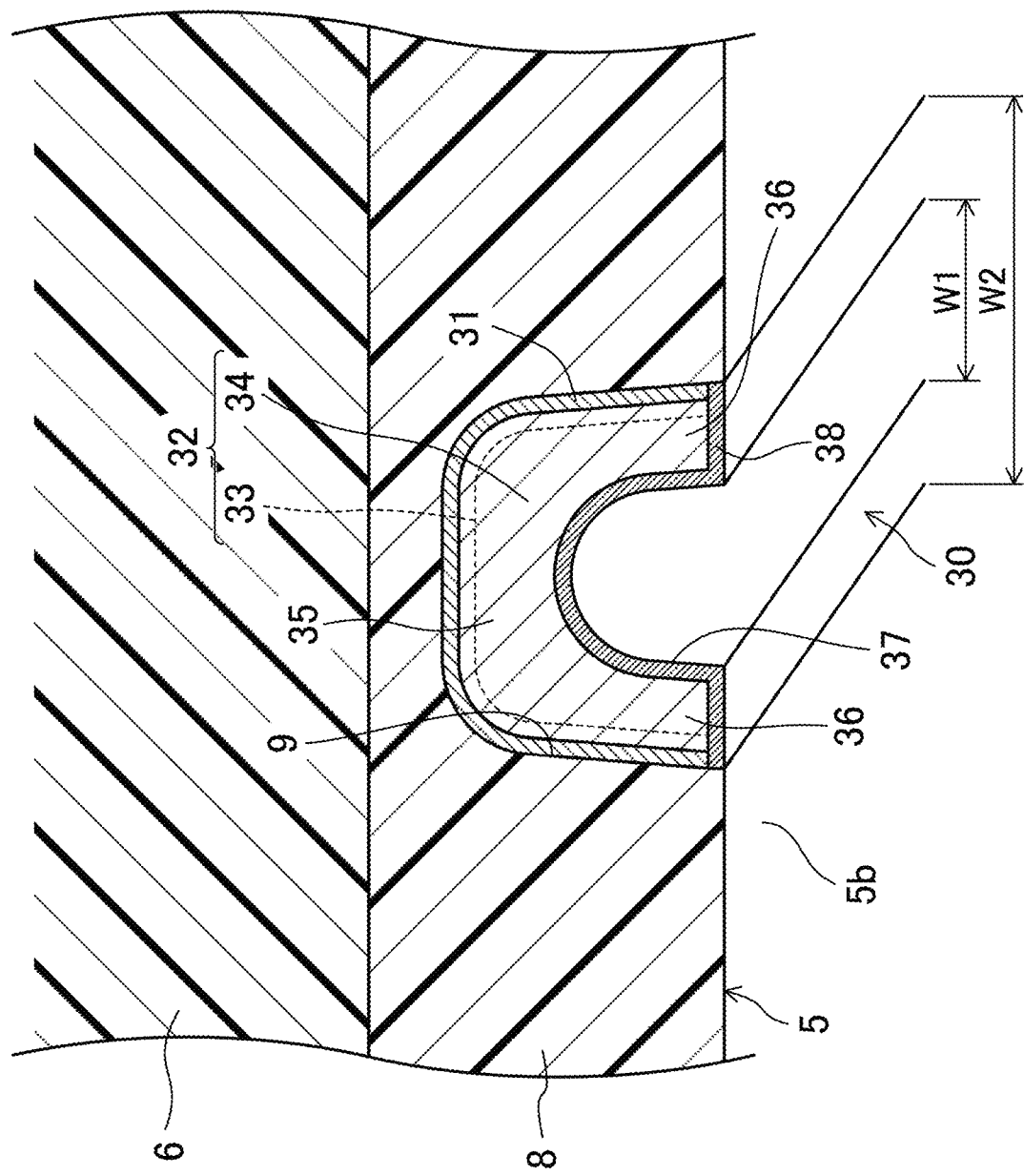
FIG. 12 is a cross-sectional view schematically showing a cross section of each fine line of each second electrode.

As shown in FIGS. 11 and 12, the substrate 5 has a film base 6. The film base 6 is made of a transparent resin material. Examples of the transparent resin material include resin materials such as polyethylene terephthalate (PET), polycarbonate, cycloolefin polymer (COP), and cycloolefin copolymer (COC).

The substrate 5 includes the first and second groove forming layers 7 and 8. The first and second groove forming layers 7 and 8 are for forming grooves 9, 9, . . . , which will be described later, and made of an insulating and transparent resin material.

The first groove forming layer 7 is stacked on the front side of the film base 6. The surface of the first groove forming layer 7 faces the back surface of the cover member 2. That is, the front surface of the groove forming first layer 7 corresponds to the first surface 5a of the substrate 5. The first groove forming layer 7 has a thickness ranging from 1.8 μm to 4.2 μm, for example.

The second groove forming layer 8 is stacked on the back side of the film base 6. The back surface of the second groove forming layer 8 faces the back surface of the cover member 2. That is, the back surface of the second groove forming layer 8 corresponds to the second surface 5b of the substrate 5. The second groove forming layer 8 has a thickness ranging from 1.8 μm to 4.2 μm, for example.

As shown in FIGS. 11 and 12, each of the first and second surfaces 5a and 5b of the substrate 5 has the plurality of grooves 9, 9, . . . . The grooves 9 linearly extend to form a predetermined pattern, which will be described later, on each of the first and second surfaces 5a and 5b.

Figure 13:
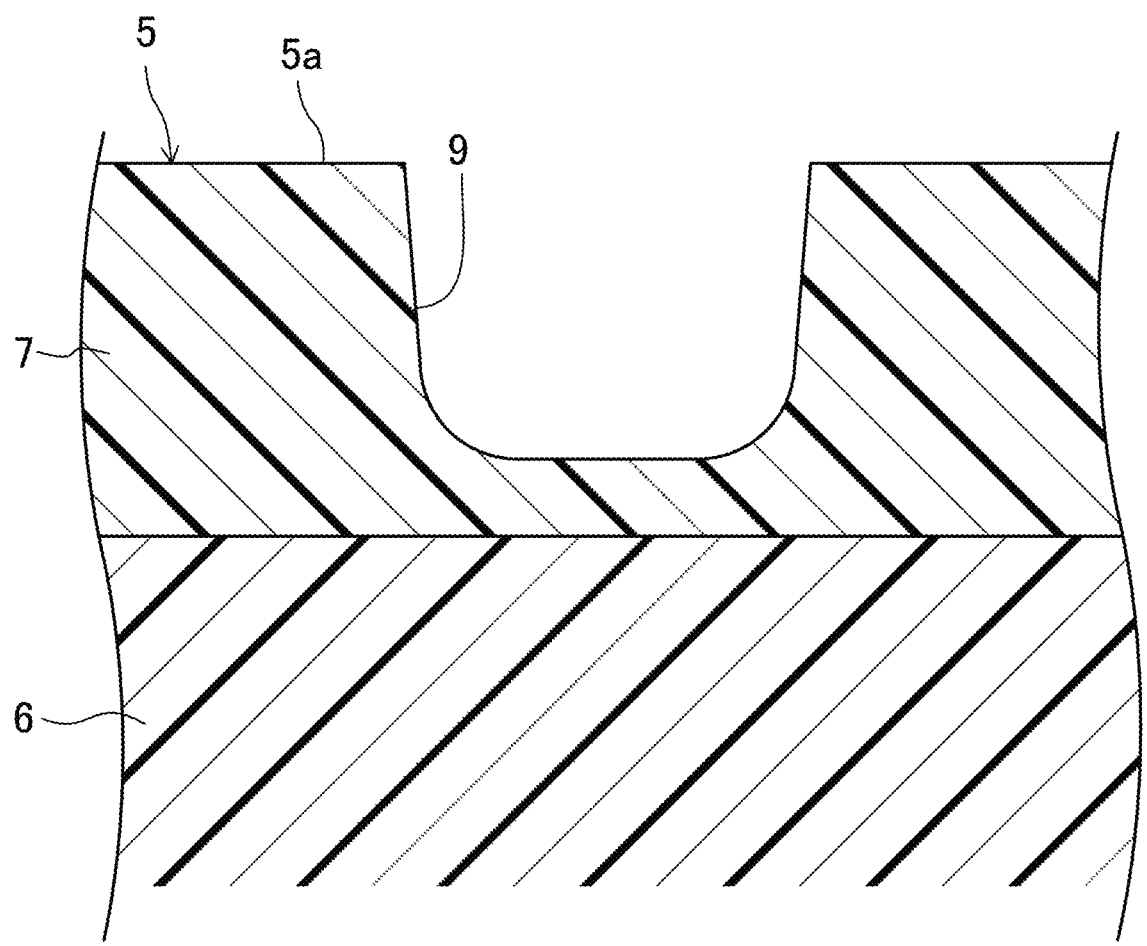
FIG. 13 is a cross-sectional view schematically showing a cross section after forming each groove in a first groove layer.

Each groove 9 on the first surface 5a is formed, in the first groove forming layer 7, in a bottomed shape recessed from the first surface 5a toward the front surface of the film base 6 (see FIG. 13). Each groove 9 on the second surface 5b is formed, in the second groove forming layer 8, in a bottomed shape recessed from the second surface 5b toward the back surface of the film base 6. Each groove 9 has a depth set in a range from 0.5 μm to 3.0 μm, for example.

In this embodiment, the corner between each side surface and the bottom of each groove 9 is filleted. The side surfaces of the groove 9 may be inclined so as to gradually expand from the bottom surface of the groove 9 toward the opening. Each corner may not be filleted.

(Adhesive Layer)

As shown in FIGS. 6 and 8, the touch sensor 1 includes the adhesive layers 21 and 21. Each adhesive layer 21 is stacked one of the first and second surfaces 5a and 5b of the substrate 5. The adhesive layer 21 is made of a transparent optical clear adhesive (OCA) with a thickness ranging from 25 μm to 250 μm in one preferred embodiment.

Each adhesive layer 21 is partially cut out into a cutout 22. Specifically, the adhesive layer 21 on the first surface 5a has the cutout 22 corresponding to the mount for a first connector 18, which will be described later, on the first surface 5a. The adhesive layer 21 on the second surface 5b has the cutout 22 corresponding to the mount for a second connector 19, which will be described later, on the second surface 5b.

(First and Second Electrodes)

As shown in FIGS. 3 to 6, the touch sensor 1 includes a plurality of first electrodes 11, 11, . . . and a plurality of second electrodes 12, 12, . . . of a capacitance type.

The first and second electrodes 11, 11, . . . and 12, 12, . . . are arranged in the view area V. In the touch sensor 1, a touch operation by the user's finger F (i.e., a detection target connected to the ground (GND)) touching the operation screen 4 of the cover member 2 through the first and second electrodes 11, 11, . . . and 12, 12, . . . in the view area V (see FIG. 6).

Figure 4:
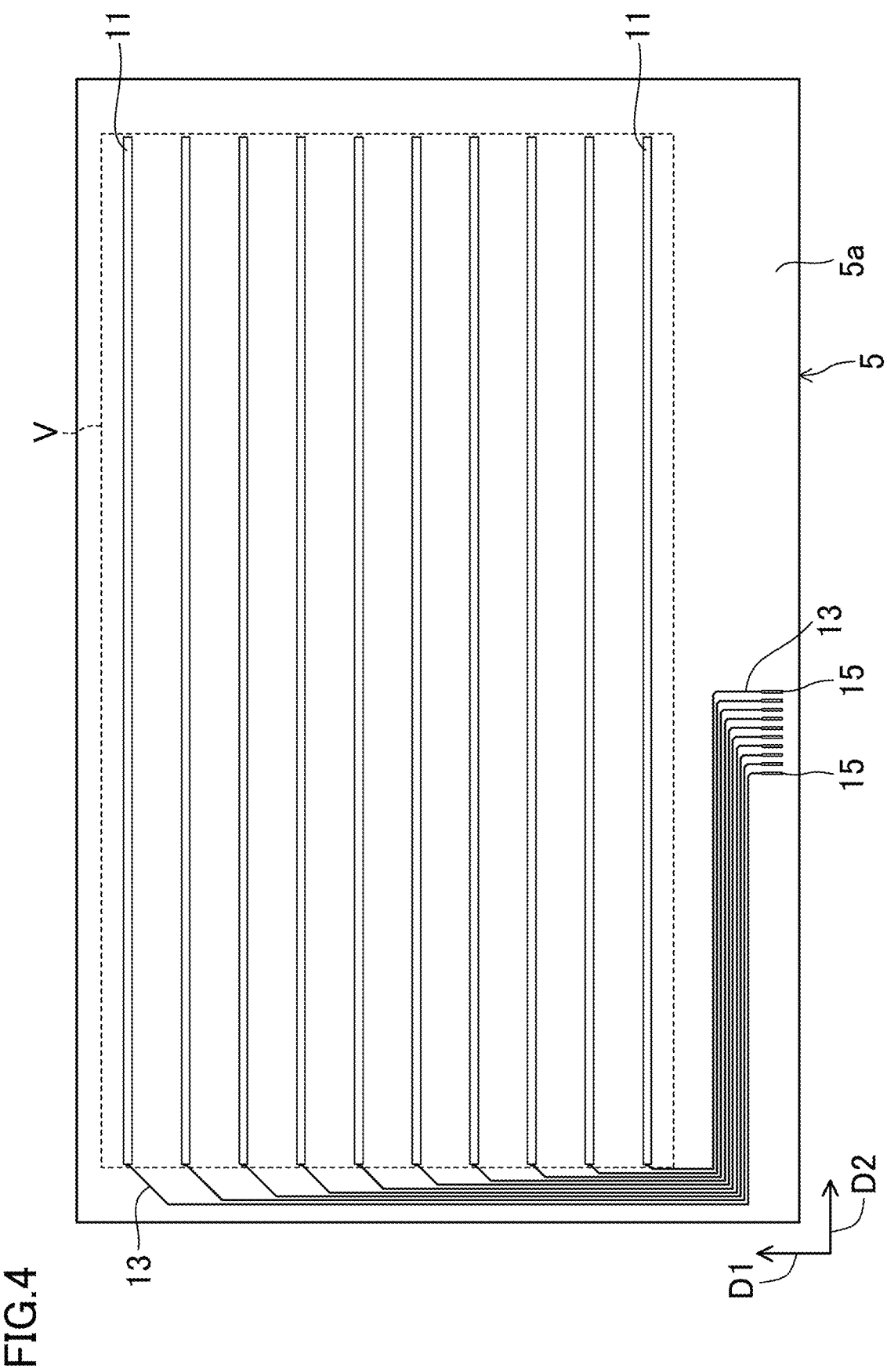
FIG. 4 is a plan view showing respective configurations of the substrate, the first electrodes, and the first leads as viewed from the first surface of the substrate.
Figure 5:
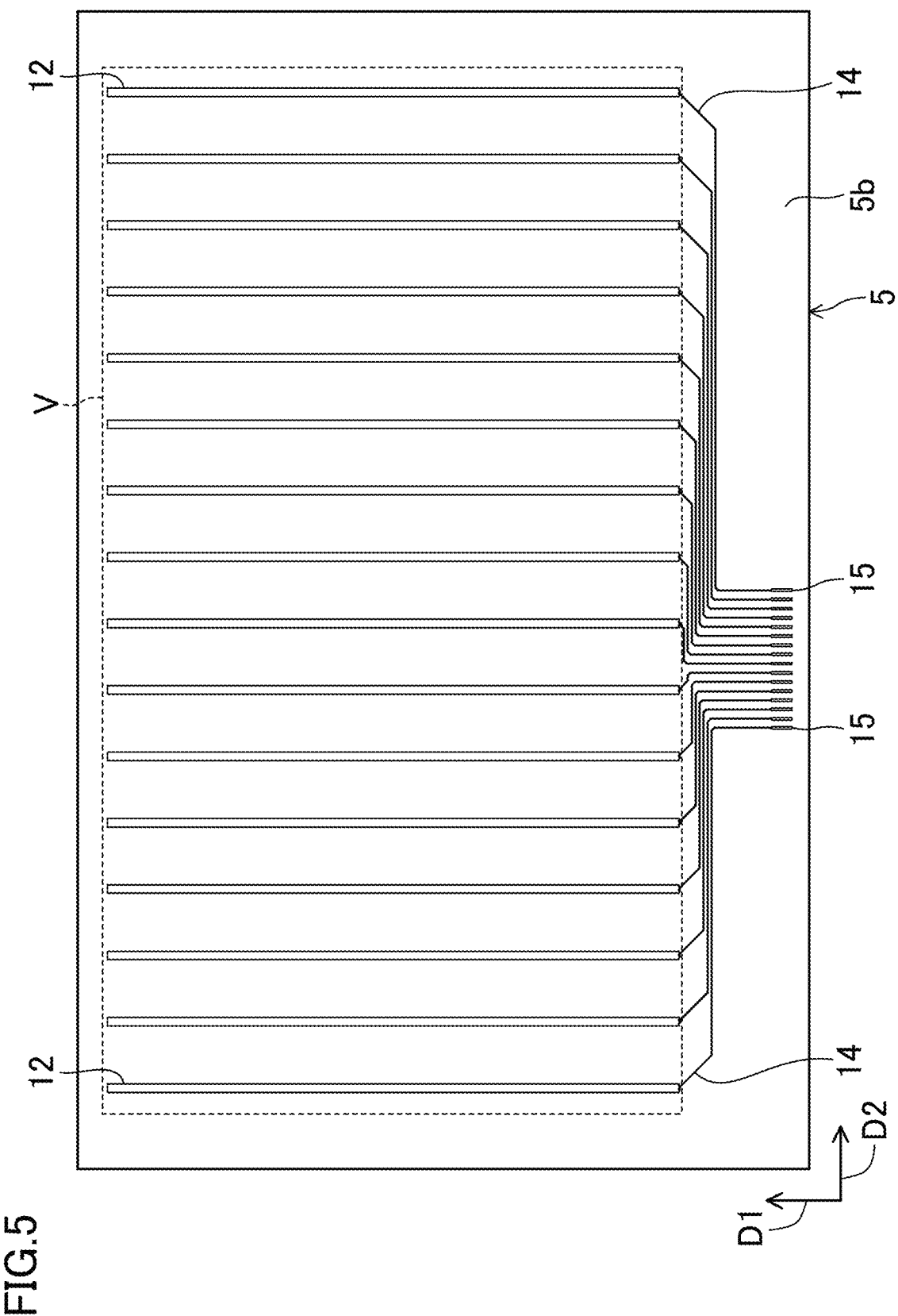
FIG. 5 is a bottom view showing respective configurations of the substrate, the second electrodes, and the second leads as viewed from a second surface of the substrate.

As shown in FIG. 4, each first electrode 11 is located on the first surface 5a of the substrate 5. On the other hand, as shown in FIG. 5, each second electrode 12 is located on the second surface 5b of the substrate 5. That is, the second electrodes 12 are insulated from the first electrodes 11 via the substrate 5.

As shown in FIG. 6, the first electrodes 11 receive an electric field E (see the two-dot chain line in FIG. 6) emitted from the second electrodes 12. That is, each first electrode 11 serves as a receiver electrode.

Figure 3:
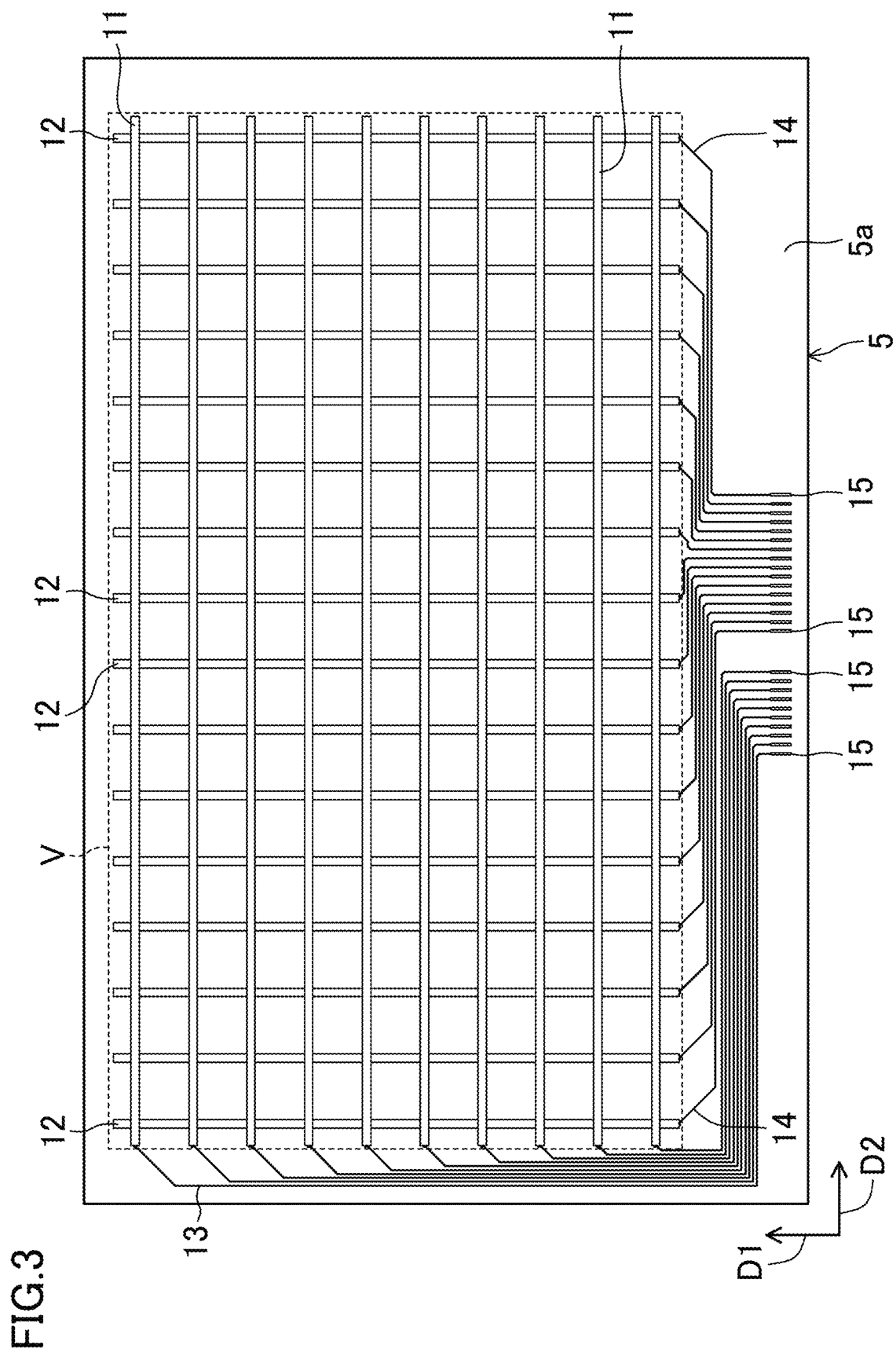
FIG. 3 is a perspective view schematically showing respective configurations of the substrate, first electrodes, second electrodes, first leads, and second leads as viewed from a first surface of the substrate.

As shown in FIGS. 3 and 4, each first electrode 11 extends substantially in a band shape along the longer sides (i.e., in the second direction d2) of the substrate 5 in a plan view. The first electrodes 11, 11, . . . are arranged at intervals along the shorter sides (i.e., in the first direction d1) of the substrate 5. Each first electrode 11 is connected to a detection circuit (not shown) via a flexible wiring board 16 which will be described later.

As shown in FIG. 6, each second electrode 12 is connected to a drive circuit (not shown) via the flexible wiring board 16, which will be described later. This drive circuit emits the electric field E to the periphery. That is, each second electrode 12 serves as a transmitter electrode.

As shown in FIGS. 3 and 5, each second electrode 12 extends substantially in a band shape along the shorter sides (i.e., in the first direction d1) of the substrate 5 in a plan view. The second electrodes 12, 12, . . . are arranged at intervals along longer sides (i.e., in the second direction d2) of the substrate 5.

Each of the first and second electrodes 11 and 12 includes a plurality of fine lines 30, 30, . . . . Specifically, each the first and second electrodes 11 and 12 is obtained by arranging the fine lines 30, 30, . . . in a predetermined pattern on one of the first and second surfaces 5a and 5b of the substrate 5. Examples of the predetermined pattern includes a first pattern (i.e., a mesh) obtained by arranging the fine lines 30, 30, . . . in a mesh (see FIG. 7).

Figure 7:
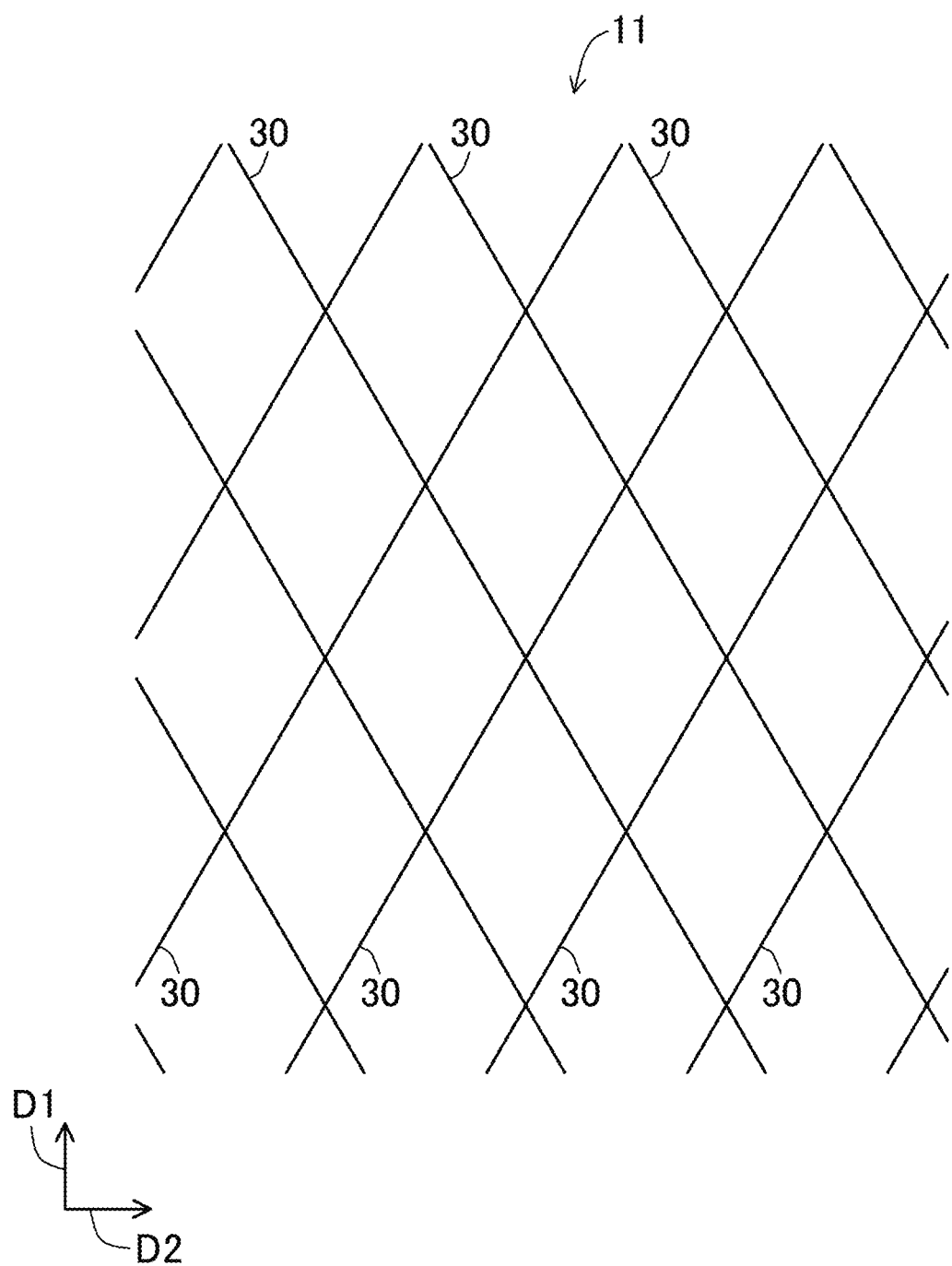
FIG. 7 is a partially enlarged plan view showing an enlarged part of each first electrode.

As shown in FIG. 7, the first pattern includes the fine lines 30, 30, . . . intersecting each other and arranged at predetermined intervals (e.g., at an equal interval in the shown example) into the mesh. That is, the first pattern is a network structure obtained by regularly arranging a plurality of cells which are the fine lines 30, 30, . . . . The cells are in the shape of a parallelogram in the same size.

Each fine line 30 forming the first pattern extends obliquely from both the first and second directions d1 and d2. Each fine line 30 has a width of several micrometers, for example. Specifically, each of the first and second electrodes 11 and 12 includes the fine lines 30 with a line width set to 2 μm or less in order to ensure the visibility of the view area V. A specific configuration of each fine line 30 will be described later.

Here, the predetermined pattern is not limited to the first pattern (i.e., the mesh), and may be, for example, a second pattern obtained by arranging the plurality of fine lines 30, 30, . . . in a ladder, or a third pattern obtained by arranging the plurality of fine lines 30, 30, . . . in a shape other than the mesh or the ladder.

(First and Second Leads)

As shown in FIGS. 3 to 5, the touch sensor 1 includes a plurality of first leads 13, 13, . . . and a plurality of second leads 14, 14, . . . . The first and second leads 13, 13, . . . and 14, 14, . . . are elements for electrically connecting the first and second electrodes 11, 11, . . . and 12, 12, . . . to an external circuit (not shown).

The first and second leads 13, 13, . . . and 14, 14, . . . are arranged on the peripheral edge of the substrate 5 (i.e., on the outer side of the view area V). Specifically, the first and second leads 13, 13, . . . and 14, 14, . . . overlap the fringe 3 (see FIGS. 1 and 8) in a plan view seen from the operation screen 4. That is, the first and second leads 13, 13, . . . and 14, 14, . . . are invisible from the operation screen 4 due to the fringe 3. In FIG. 6, the first and second leads 13, 13, . . . and 14, 14, . . . are not shown for the sake of simplicity.

As shown in FIGS. 4 and 8, the first leads 13 are formed on the first surface 5a of the substrate 5. One end of each first lead 13 is electrically connected to one end of one of the first electrodes 11 (i.e., an end on the left on the paper of FIG. 4). In addition, the other ends of the first leads 13, 13, . . . are collected substantially at the center in the direction along the longer sides of the substrate 5 at the peripheral edge of the first surface 5a at the bottom on the paper of FIG. 4.

The other end of each first lead 13 includes a connection pad 15 for electrically connecting to the first connector 18 of the flexible wiring board 16, which will be described later. The other end of the first lead 13 is electrically connected to the flexible wiring board 16 via the connection pad 15.

As shown in FIGS. 5 and 8, the second leads 14 are formed on the second surface 5b of the substrate 5. One end of each second lead 14 is electrically connected to one end of one of the second electrodes 12 (i.e., an end located below on the paper of FIG. 5). In addition, the other ends of the second leads 14, 14, . . . extend to be collected substantially at the center in the direction along the longer sides of the substrate 5 at the peripheral edge of the second surface 5b at the bottom on the paper of FIG. 5. The other end of each of the second leads 14, 14, . . . is spaced apart from the other end of one of the first leads 13 in the direction (the second direction d2) along the longer sides of the substrate 5.

The other end of each second lead 14 includes the connection pad 15 for electrically connecting to the second connector 19 of the flexible wiring board 16, which will be described later. The other end of the second lead 14 is electrically connected to the flexible wiring board 16 via the connection pad 15.

Figure 9:
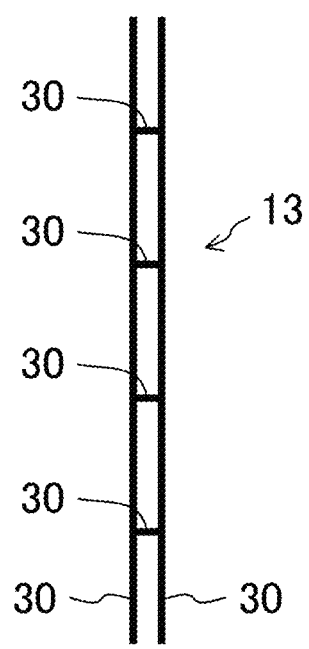
FIG. 9 is a partially enlarged plan view showing an enlarged part of each first lead.
Figure 10:
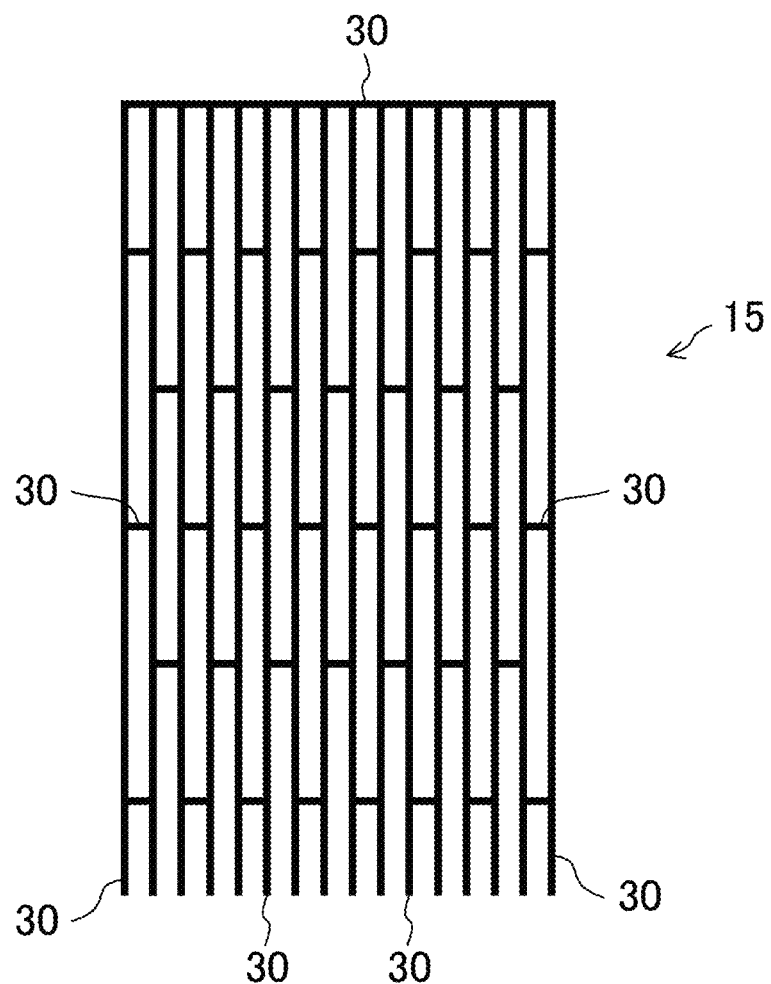
FIG. 10 is a partially enlarged plan view showing an enlarged part of a connecting pad.

Each of the first leads 13, the second leads 14, and the connection pads 15 includes the plurality of fine lines 30, 30, . . . in a predetermined pattern on each of the first and second surfaces 5a and 5b of the substrate 5. Specifically, each of the first leads 13, the second leads 14, and the connection pads 15 includes the fine lines 30, 30, . . . in a ladder (corresponding to the second pattern described above) (see FIGS. 9 and 10). Unlike the first and second electrodes 11 and 12, each of the first leads 13, the second leads 14, and the connection pads 15 includes the fine lines 30 with a line width of 10 μm or less.

(Flexible Wiring Board)

As shown in FIG. 1, the touch sensor 1 includes the flexible wiring board 16. The flexible wiring board 16 has flexibility and electrical characteristics unchanged even in a deformed state. The flexible wiring board 16 is made of a flexible insulating film such as polyimide (PI), polyethylene terephthalate (PET), or polyethylene naphthalate (PEN).

Figure 2:
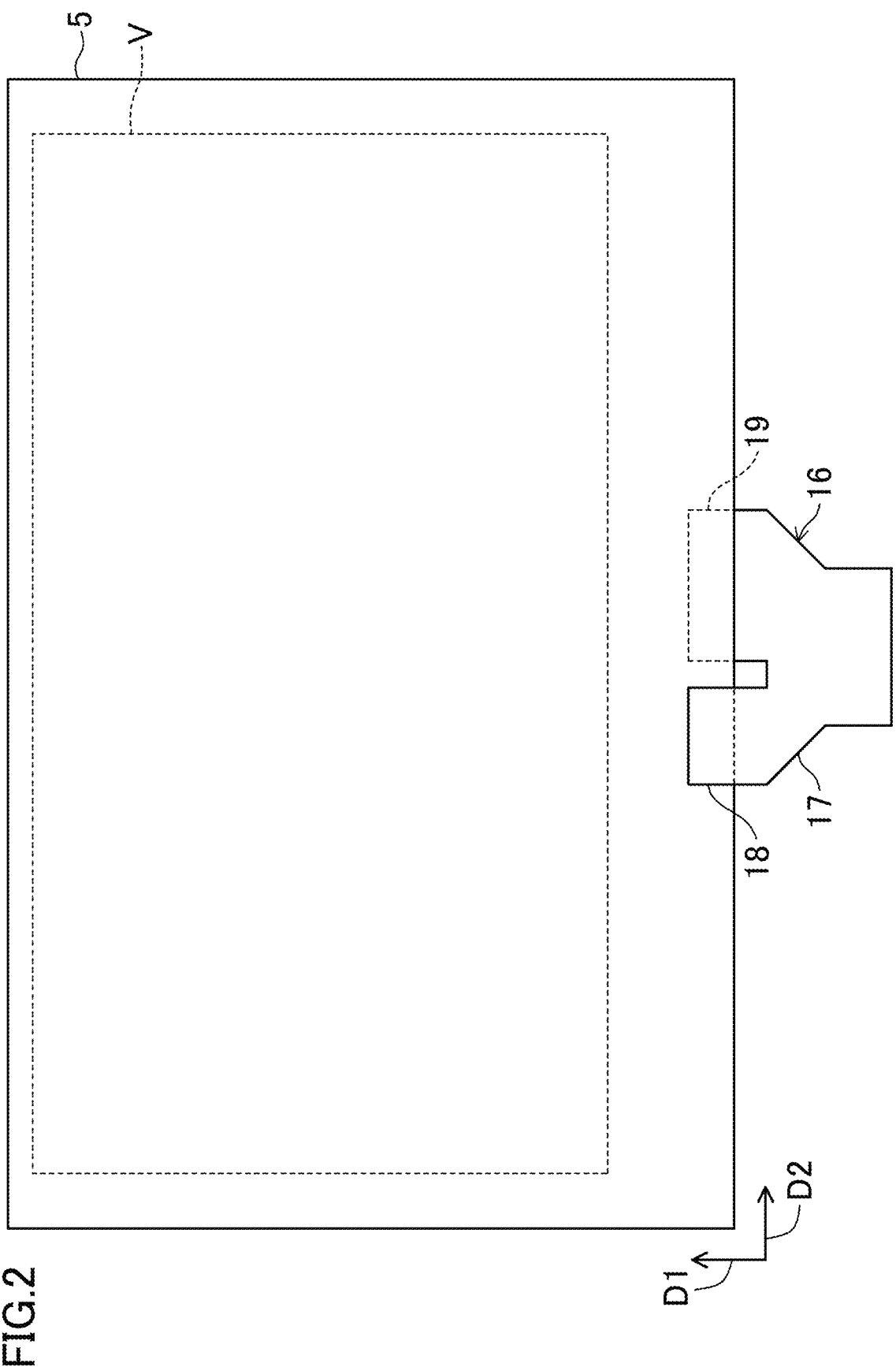
FIG. 2 is a plan view schematically showing a connection between a substrate and a flexible circuit board.

As shown in FIG. 2, the flexible wiring board 16 includes a body 17, the first connector 18, and the second connector 19. The first and second connectors 18 and 19 are integral with the body 17 and branched off from one end of the body 17 in two directions.

As shown in FIG. 8, the first connector 18 is fixed to the peripheral edge of the first surface 5a with an anisotropic conductive adhesive (not shown), for example. In this fixed state, the first connector 18 is electrically connected to the first leads 13, 13, . . . .

The second connector 19 is fixed to the peripheral edge of the second surface 5b with the anisotropic conductive adhesive described above. In this fixed state, the second connector 19 is electrically connected to the second leads 14, 14, . . . .

(Protective Film)

As shown in FIGS. 6 and 8, the touch sensor 1 includes a protective film 23. The protective film 23 is made of a film material for mainly protecting the second electrodes 12, 12, . . . and the second leads 14, 14, . . . . Examples of this film material include resin materials such as polyethylene terephthalate (PET), polycarbonate, cycloolefin polymer (COP), cycloolefin copolymer (COC), and PE.

The protective film 23 is substantially in a rectangular shape, for example, in a plan view and in the same size as the substrate 5. The protective film 23 is stacked to face the second surface 5b of the substrate 5. Specifically, the protective film 23 is fixed to the second surface 5b of the substrate 5 by the adhesive layer 21.

(Fine Line)

As shown in FIGS. 11 and 12, each fine line 30 includes a conductive material buried in a groove 9. Each fine line 30 includes an adhesive layer 31, a conductive layer 32, and a blackened layer 38, for example.

The adhesive layer 31 is an element for ensuring the adhesiveness of the conductive layer 32 to the groove 9. In addition, the adhesive layer 31 functions to make the fine lines 30 less visible by the user from the operation screen 4 of the touch sensor 1.

The adhesive layer 31 is a metal layer made of a metal nitride or a metal oxide containing at least one metal selected from the group consisting of Ti, Al, V, W, Ta, Si, Cr, Ag, Mo, Cu, and Zn, for example. The adhesive layer 31 may be a single layer or a multilayer obtained by stacking a plurality of layers with different compositions. The adhesive layer 31 is stacked as a thin film on the groove 9 by vapor deposition or sputtering, for example.

The conductive layer 32 is an element for ensuring the conductivity of the fine lines 30. In this embodiment, the conductive layer 32 includes a seed layer 33 and a body layer 34. Both the seed layer 33 and the body layer 34 are made of a conductive material. Suitable as the conductive material is a conductive metal such as copper (Cu) or silver (Ag). The conductive metal may be replaced with, for example, a transparent conductive material such as a conductive resin material, indium tin oxide, or tin oxide.

The seed layer 33 functions to improve the adhesiveness between the adhesive layer 31 and the body layer 34. Specifically, the seed layer 33 functions as a cathode for depositing a plating solution such as copper (Cu) on the adhesive layer 31, for example, in electroplating for forming the body layer 34. The seed layer 33 is stacked as a thin film on the adhesive layer 31 by vapor deposition or sputtering, for example. If the body layer 34 is formed by a method other than the electroplating, no seed layer 33 may be provided.

The body layer 34 is formed by vapor deposition, sputtering, electroless plating, or electroplating, for example. In this embodiment, the body layer 34 is stacked on the seed layer 33 by electroplating. After the electroplating, the seed layer 33 and the body layer 34 are integral so that the interface between the seed layer 33 and the body layer 34 is invisible.

The conductive layer 32 has a bottom 35 and a pair of sidewalls 36 and 36. The bottom 35 is located near the bottom surface of the groove 9 in a cross-sectional view. Each sidewall 36 is located near a side surface of the groove 9 integrally with the bottom 35 in a cross-sectional view. Each sidewall 36 has an end surface facing the adhesive layer 21 near the first or second surface 5a or 5b.

As a feature of the present disclosure, each fine line 30 has a recess 37. The recess 37 is in a bottomed shape recessed from the first or second surface 5a or 5b toward the bottom surface of the groove 9. Specifically, the recess 37 is interposed between the bottom 35 and the sidewalls 36 and 36 substantially at the center in the direction along the width of the groove 9 in a cross-sectional view.

The recess 37 has the length extending in the extending direction of the groove 9. In one preferred embodiment, the opening width (see reference character W1 shown in FIGS. 11 and 12) of the recess 37 orthogonal to the extending direction is larger than a size corresponding to one-fourth of the width (see reference character W2 shown in FIGS. 11 and 12) of the groove 9 orthogonal to the extending direction.

In this embodiment, each of the bottom surface (i.e., the surface closer to the bottom 35) of the recess 37 and the side surfaces (i.e., the surfaces closer to the sidewalls 36) of the recess 37 has a predetermined radius of curvature. That is, both the bottom and side surfaces of the recess 37 is curved. Specifically, the bottom and side surfaces of the recess 37 are continuously formed into a curve. The recess 37 is formed in one preferred embodiment such that the bottom surface has a smaller radius of curvature than the side surfaces.

Next, the blackened layer 38 functions to make the fine lines 30 less visible by the user from the operation screen 4 of the touch sensor 1. In this embodiment, the blackened layer 38 serves as an overlying layer of the sidewalls 36 and 36 and the recess 37.

(Step of Forming Grooves and Fine Lines)

With reference to FIGS. 13 to 19, a process of forming the grooves 9 and the fine lines 30 will be described. In the following forming step, only the grooves 9 in the first groove forming layer 7 and the fine lines 30 forming the first electrodes 11 will be described.

Figure 14:
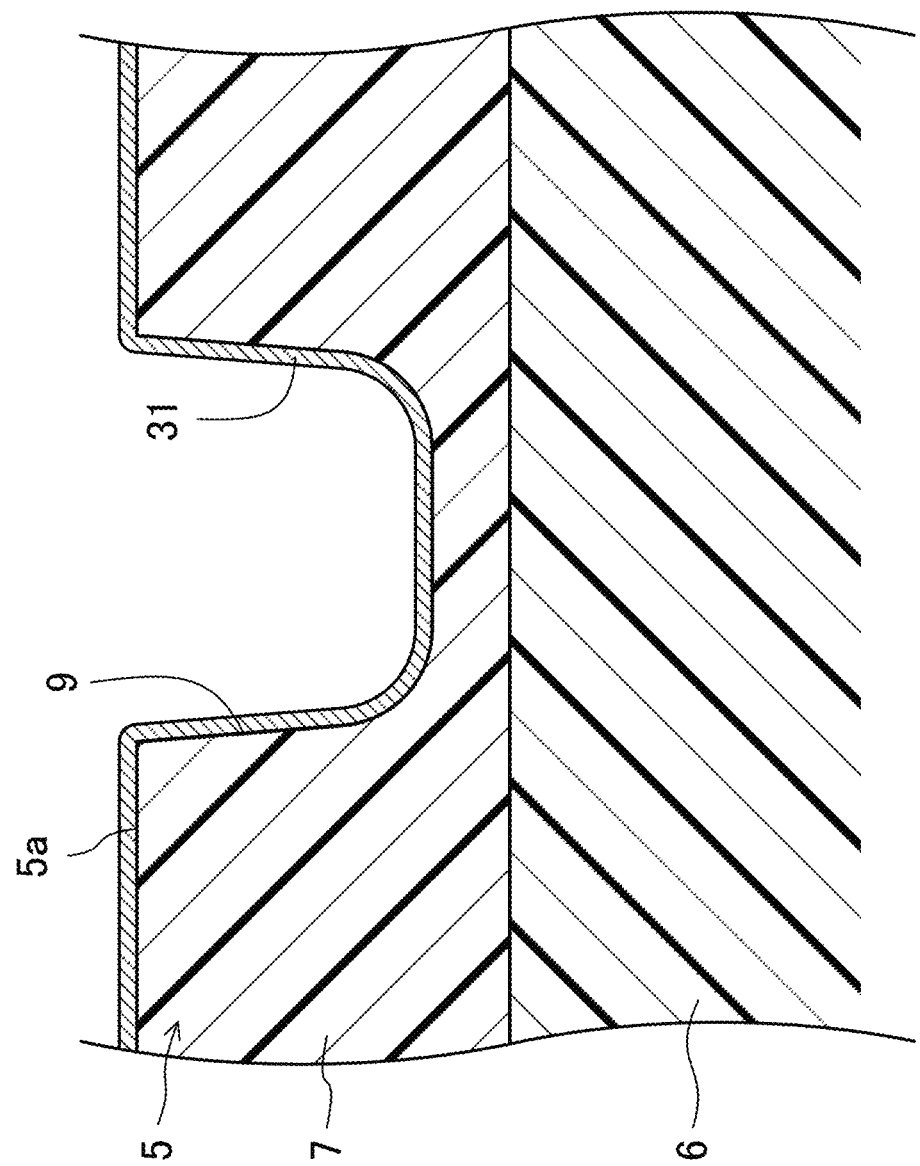
FIG. 14 is a cross-sectional view schematically showing the cross section after forming an adhesive layer on the groove.

As shown in FIG. 13, each groove 9 is formed in the first groove forming layer 7. Next, as shown in FIG. 14, the metal layer described above and made of a metal nitride or a metal oxide is formed as a thin film on the first surface 5a and the groove 9 by vapor deposition or sputtering. Through this film formation, the adhesive layer 31 is formed in the groove 9.

Figure 15:
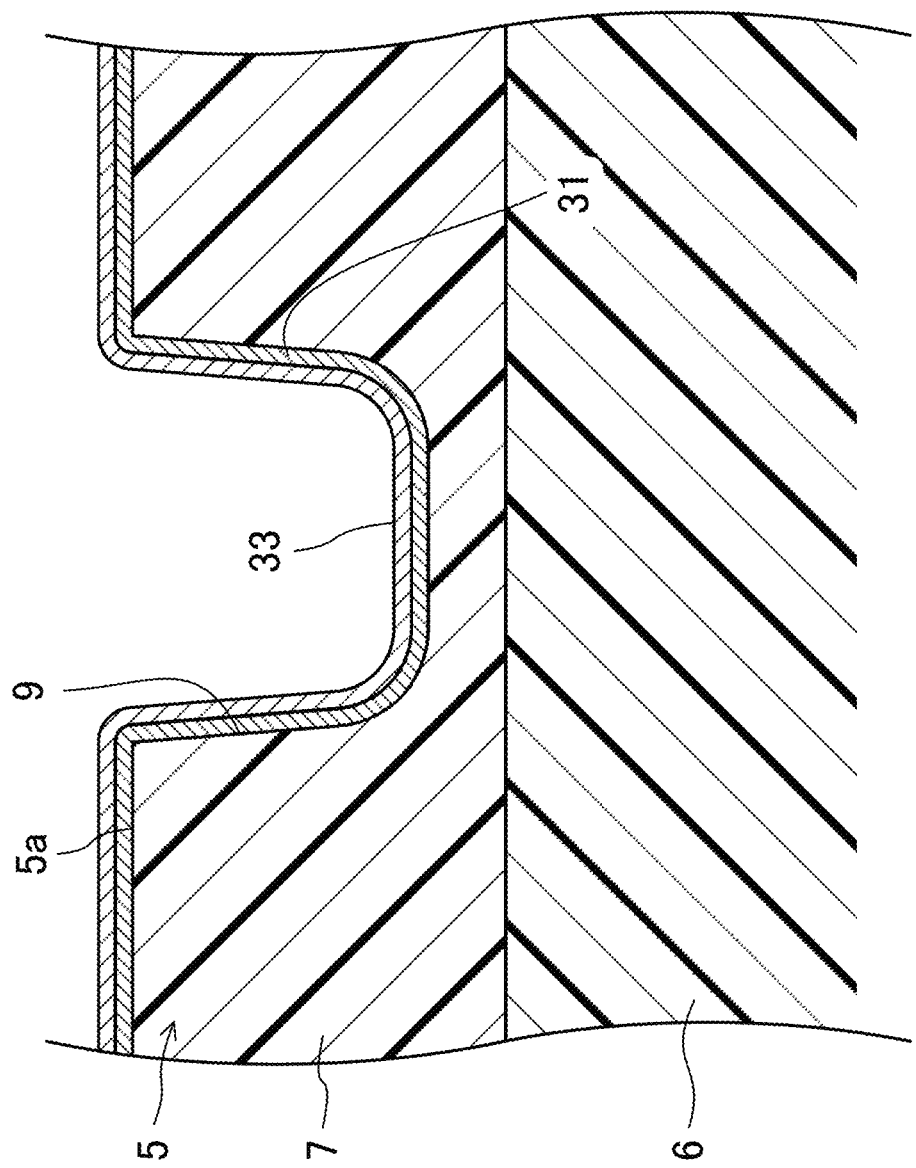
FIG. 15 is a cross-sectional view schematically showing the cross section after forming a seed layer on the adhesive layer.

As shown in FIG. 15, after forming the adhesive layer 31, for example, copper (Cu) is formed as a thin film on the adhesive layer 31 by vapor deposition or sputtering. Through this film formation, the seed layer 33 is formed in the groove 9.

Figure 16:
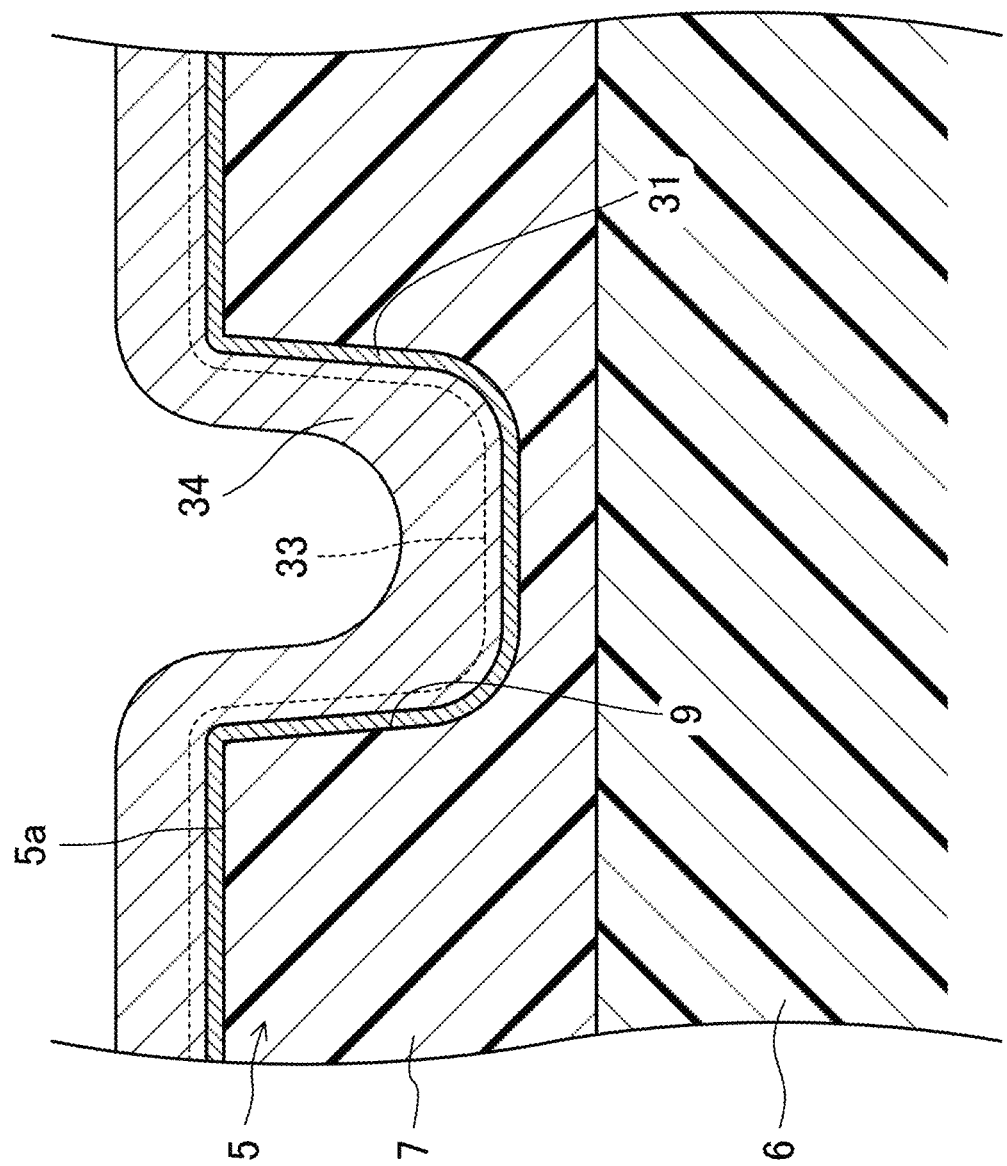
FIG. 16 is a cross-sectional view schematically showing the cross section after forming a conductive metal on the adhesive layer.
Figure 17:
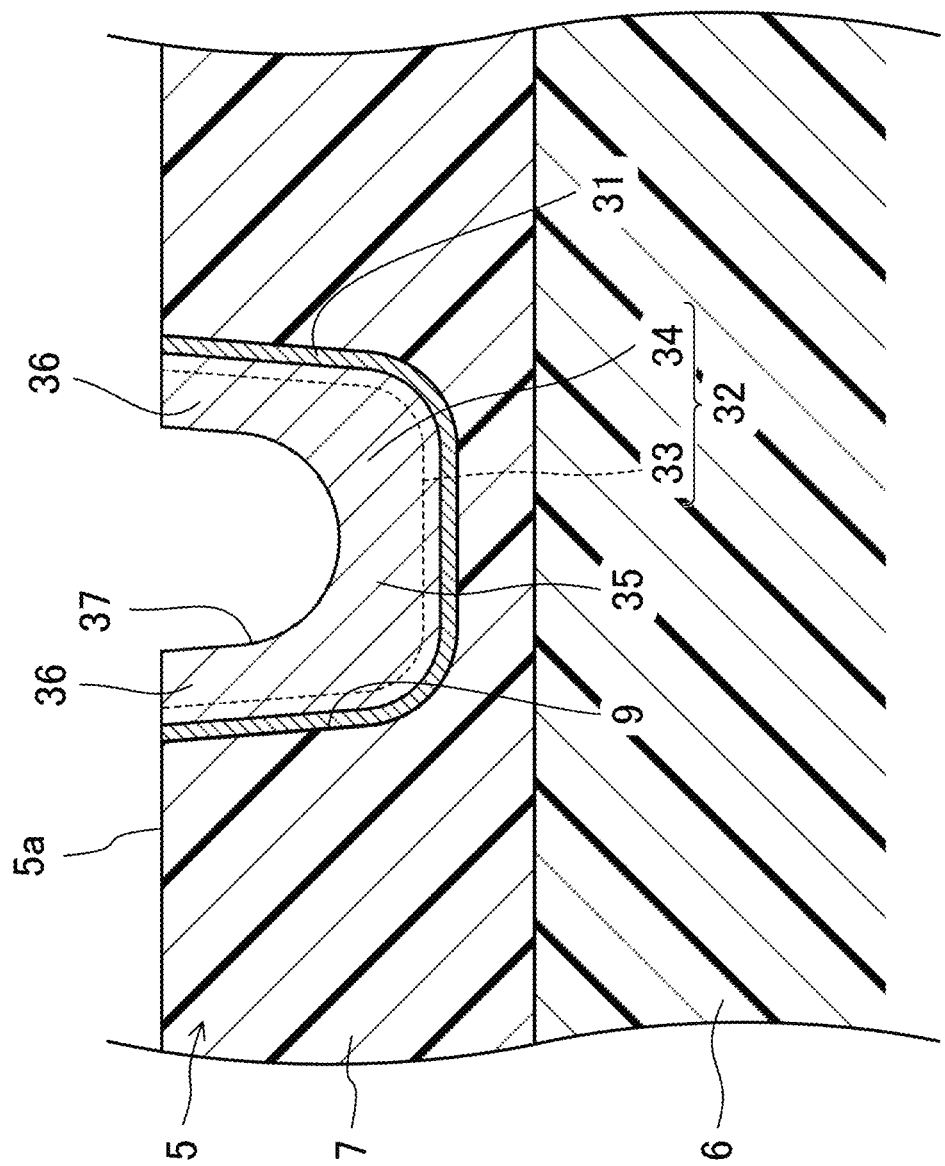
FIG. 17 is a cross-sectional view schematically showing the cross section after forming a conductive layer.
Figure 18:
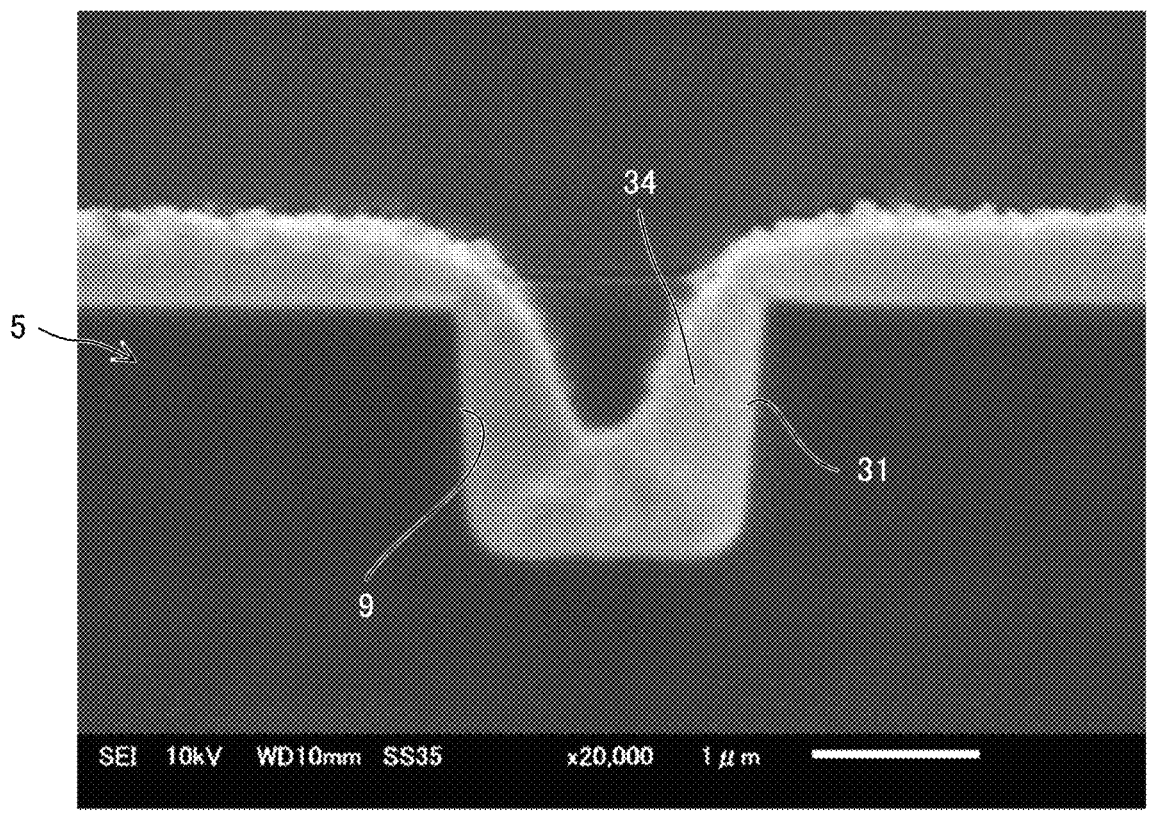
FIG. 18 is an electron micrograph showing a cross section of a sample after forming a conductive metal on an adhesive layer.
Figure 19:
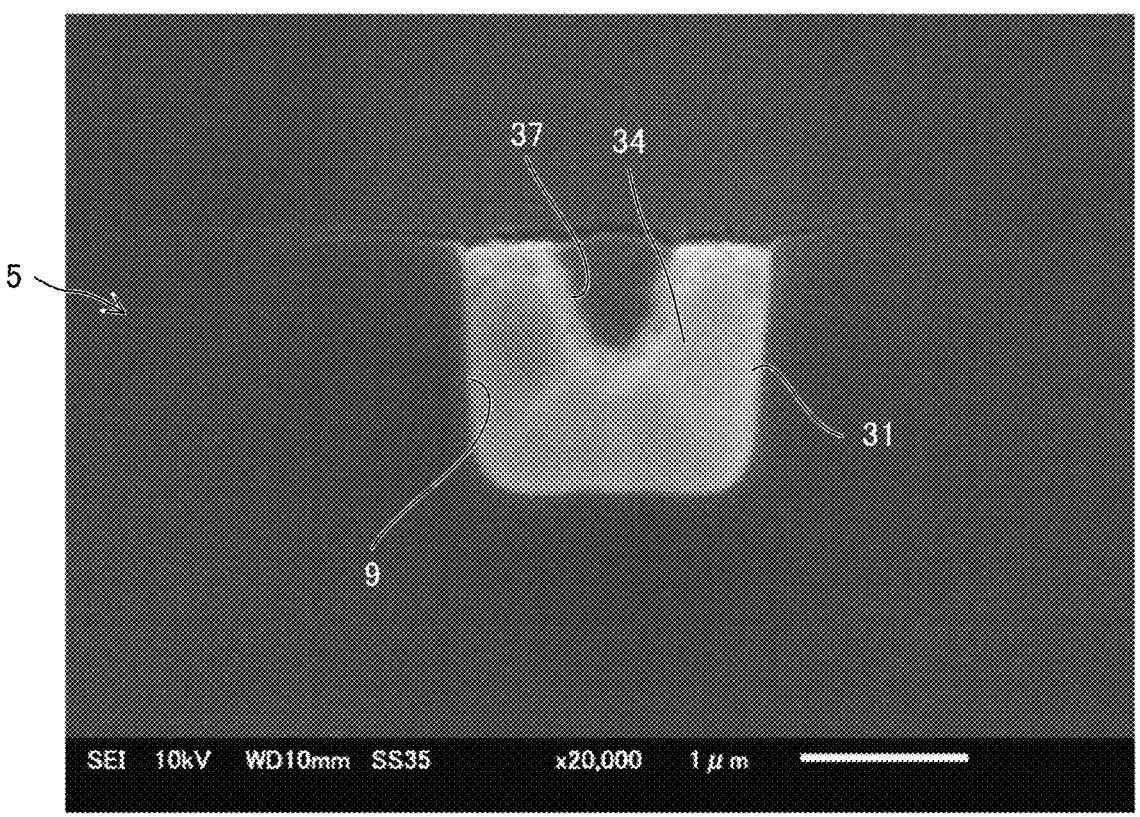
FIG. 19 is an electron micrograph showing a cross section of a sample after forming a conductive layer.

As shown in FIGS. 16 and 18, after forming the seed layer 33, a conductive metal such as copper (Cu) is deposited on the entire area of the seed layer 33 by electroplating, for example, using the seed layer 33 as a cathode. In this electroplating, the amount of the deposited copper is adjusted so that the substantial center in the direction along the width of the groove 9 dents partially. Next, as shown in FIGS. 17 and 19, after a predetermined amount of Cu is deposited by electroplating, the excessive Cu deposited on the first surface 5a is removed. As a result, the body layer 34 and the recess 37 are formed in the groove 9.

As shown in FIG. 11, after forming the body layer 34, blackening is performed to form the blackened layer 38. At the end, the blackened layer 38 is subjected to rustproofing to form a rust-proof film (not shown).

Through the steps described above, the grooves 9 and the fine lines 30 are formed.

In this embodiment, the grooves 9 in the second groove forming layer 8 are formed by the same process as the grooves 9 in the first groove forming layer 7. In addition, the fine lines 30 forming each of the second electrodes 12, the first leads 13, the second leads 14, and the connection pads 15 are formed by the same process as the fine lines 30 forming the first electrodes 11.

Advantages of Embodiment

As described above, each of the fine lines 30 forming the first electrodes 11 has the bottomed recess 37 recessed from the first surface 5a toward the bottom surface of the corresponding groove 9. In this embodiment, external light (e.g., sunlight or illumination light) incident from the outside of the touch sensor 1 (i.e., from the operation screen 4 of the cover member 2) toward the inside of the touch sensor 1 tends to be reflected specularly toward the outside of the touch sensor 1 at each fine line 30 closer to the end surfaces of the sidewalls 36 and 36. On the other hand, after entering the recess 37 of each fine line 30, the external light is reflected (i.e., diffused) in various directions in the recess 37. That is, the external light that has entered the recess 37 tends to be reflected specularly toward the outside of the touch sensor 1 due to the diffusion. As described above, each fine line 30 with the recess 37 specularly reflects not all the external light incident on the fine line 30 toward the outside of the touch sensor 1. This configuration reduces the reflectance of each fine line 30 at the specular reflection of the external light. As a result, the fine lines 30 becomes inconspicuous. Specifically, the first electrodes 11, 11, . . . in the view area V become inconspicuous when the user views from the outside of the touch sensor 1. Accordingly, the touch sensor 1 according to the embodiment of the present disclosure improves the visibility of the view area V.

Since the bottom and side surfaces of the recess 37 are formed into a curve, the external light that has entered the recess 37 tends to be diffused in various directions. This configuration reduces the reflectance at the diffused reflection of the external light and the first electrodes 11, 11, . . . becomes inconspicuous in the view area V. Accordingly, the visibility of the view area V of the touch sensor 1 improves.

The bottom of the recess 37 has a smaller radius of curvature than the side surfaces of the recess 37. With this configuration, the external light that has entered the recess 37 deeply tends to be diffused on the bottom surface of the recess 37. This configuration further reduces the reflectance at the diffused reflection of the external light and the first electrodes 11, 11, . . . becomes inconspicuous in the view area V. Accordingly, the visibility of the view area V of the touch sensor 1 further improves.

The opening width W1 of the recess 37 orthogonal to the extending direction is larger than a size corresponding to one-fourth of the width W2 of the groove 9 orthogonal to the extending direction. That is, the opening width W1 of the recess 37 accounts for a high ratio of the opening width W2 of each fine line 30. With this configuration, the external light tends to enter the recess 37. This configuration reduces the reflectance at the diffused reflection of the external light and the first electrodes 11, 11, . . . becomes inconspicuous in the view area V. Accordingly, the visibility of the view area V of the touch sensor 1 improves.

Next, the blackened layer 38 as the upper layer of each fine line 30 makes the fine line 30 less visible by the user from the operation screen 4 of the touch sensor 1. As a result, the first electrodes 11, 11, . . . becomes inconspicuous in the view area V and the visibility of the view area V of the touch sensor 1 improves.

Other Embodiments

While the first and second directions d1 and d2 are defined as shown in FIGS. 1 to 5 in the embodiment described above, the directions are not limited thereto. For example, the first direction d1 may extend from the left to the right on the paper, whereas the second direction d2 may extend from the bottom to the top on the paper. That is, each first electrode 11 may extend along the longer sides of the substrate 5, whereas each second electrode 12 may extend along the shorter sides of the substrate 5.

While the single substrate 5 is used in the embodiment described above, the configuration is not limited thereto. For example, the substrate 5 may be a multilayer obtained by bonding two bases.

While the electrodes (i.e., the first and second electrodes 11 and 12) are formed on both surfaces (i.e., the first and second surfaces 5a and 5b) of the single substrate 5 in the embodiment described above, the configuration is not limited thereto. Specifically, the first and second electrodes 11 and 12 may be formed on only one surface (i.e., any one of the first and second surfaces 5a and 5b) of the single substrate 5.

While the rectangular view area V is employed in the embodiment described above, the configuration is not limited thereto. The view area V may be substantially in a circular shape, for example.

While each of the first and second electrodes 11 and 12 is in a band shape in the embodiment described above, the configuration is not limited thereto. For example, an intermediate portion of each second electrode 12 may protrude to taper in the second direction d2 or the opposite direction into protrusions (not shown) repeated in the extending direction. Similarly, each first electrode 11 may have the following shape in place of the band shape described above. An intermediate portion may protrude to taper in the first direction d1 or the opposite direction into protrusions (not shown) repeated in the extending direction. In other words, each electrode may be in a shape with pads in a rhombic shape, for example, repeated in the extending direction.

While each of the second electrodes 12, the first leads 13, the second leads 14, and the connection pads 15 includes the fine lines 30 like the first electrodes 11 in the embodiment described above, the configuration is not limited thereto. Specifically, each of the second electrodes 12, the first leads 13, the second leads 14, and the connection pads 15 may be originally less visible from the operation screen 4 of the touch sensor 1 and thus include fine lines (not shown) each having no recess 37. In short, in order to obtain the advantages described above in the embodiment of the present disclosure, at least the first electrodes 11 on the first surface 5a of the substrate 5 may include the fine lines 30 each having the recess 37. Examples of the fine lines each having no recess 37 include the following. The outer surface (i.e., the surface facing the adhesive layer 21) of the conductive layer 32 buried in the groove 9 is flush with the first and second surfaces 5a and 5b of the substrate 5.

While the substrate 5 includes the first and second groove forming layers 7 and 8 in the embodiment described above, the configuration is not limited thereto. Specifically, the substrate 5 may be a film base 6 with none of the first and second groove forming layers 7 and 8 stacked thereon (i.e., include only the film base 6). In this configuration, each or both of the front and back surfaces of the film base 6 may have the grooves 9, 9, . . . . Even in this case, at least the grooves 9 opening toward the viewing side may include the fine lines 30 each having the recess 37.

While the adhesive layer 31 is formed on each groove 9 in the embodiment described above, the configuration is not limited thereto. Specifically, without forming the adhesive layer 31 on each groove 9, the conductive layer 32 may be directly formed on the groove 9.

While the blackened layer 38 serves as an overlying layer of the sidewalls 36 and 36 and the recess 37 in this embodiment, the configuration is not limited thereto. The blackened layer 38 may serve as an overlying layer of at least the recess 37 to provide the advantages described above. That is, the blackened layer 38 may not serve as an overlying layer of the sidewalls 36 and 36.

While the embodiment described above shows the touch sensor 1 obtained by attaching the cover member 2, the flexible wiring board 16, the adhesive layer 21, and the protective film 23 to the substrate 5, the configuration is not limited thereto. That is, the concept of the touch sensor 1 according to the present disclosure includes a state before attaching the cover member 2, the flexible wiring board 16, the adhesive layer 21, and the protective film 23, for example, to the substrate 5. Specifically, the touch sensor 1 according to the present disclosure only needs to include at least the substrate 5 and the first electrodes 11, 11, . . . each including the fine lines 30 each buried in one of the grooves 9 on the first surface 5a of the substrate 5 and having the recess 37. This configuration provides the advantages described above. The touch sensor 1 according the present disclosure may be configured as follows. Each first electrode 11 on an elongated base member (e.g., an elongated hoop member (not shown)) before forming a plurality of substrates 5 individually may include the fine lines 30 each buried in one of the grooves 9 on a surface (i.e., the viewed surface of the touch sensor 1) corresponding to the first surface 5a of each substrate 5 and having the recess 37. This configuration also provides the advantages described above.

While the embodiment of the present disclosure has been described above, the present disclosure is not limited thereto and various modifications can be made within the scope of the present disclosure.

INDUSTRIAL APPLICABILITY

The present disclosure is industrially applicable as a touch sensor that allows a touch operation.

DESCRIPTION OF REFERENCE CHARACTERS

1: Touch sensor
2: Cover Member
3: Fringe
4: Operation Screen
5: Substrate
5a: First Surface
5b: Second Surface
6: Film Base
7: First Groove Forming Layer
8: Second Groove Forming Layer
9: Groove
11: First Electrode
12: Second Electrode
13: First Lead
14: Second Lead
15: Connection Pad
16: Flexible Wiring Board
17: Body
18: First Connector
19: Second Connector
21: Adhesive Layer
22: Cutout
23: Protective Film
30: Fine Line
31: Adhesive Layer
32: Conductive Layer
33: Seed Layer
34: Body Layer
35: Bottom
36: Sidewall
37: Recess
38: Blackened Layer
V: View Area

The invention claimed is:

1. A touch sensor with a view area, the touch sensor comprising:
a substrate with a first surface; and
a plurality of first electrodes on the first surface of the substrate in the view area, wherein:
the first surface of the substrate includes a plurality of bottomed grooves extending linearly,
each of the plurality of first electrodes includes a plurality of fine lines,
each of the plurality of fine lines includes a conductive material buried in one of the plurality of grooves,
at least one of the plurality of fine lines includes a recess recessed from the first surface toward a bottom surface of each of the plurality of grooves,
each of bottom and side surfaces of the recess are curved, an entirety of which forms a concave shape, and
each of the side surfaces of the recess is entirely curved from an opening edge of the recess to a connection point to the bottom surface so as to form a concave shape.

2. The touch sensor of claim 1, wherein
a distance along a plane direction of the substrate between each of side surfaces of the groove and a corresponding one of the side surfaces of the recess becomes gradually greater in a thickness direction of the substrate from the opening edge of the recess toward the bottom surface of the recess.

3. The touch sensor of claim 1, wherein
the bottom surface of the recess has a smaller radius of curvature than the side surface of the recess.

4. The touch sensor of claim 1, wherein
an opening width of the recess orthogonal to an extending direction thereof is larger than a size corresponding to one-fourth of a width of the plurality of grooves orthogonal to an extending direction thereof.

5. The touch sensor of claim 1, wherein
a blackened layer serves as an overlying layer of at least the recess.

* * * * *